Aug. 9, 1949.                R. B. SPRAGUE ET AL                2,478,211
                                HYDRAULIC FUSE VALVE
Filed April 9, 1945                                             2 Sheets-Sheet 1
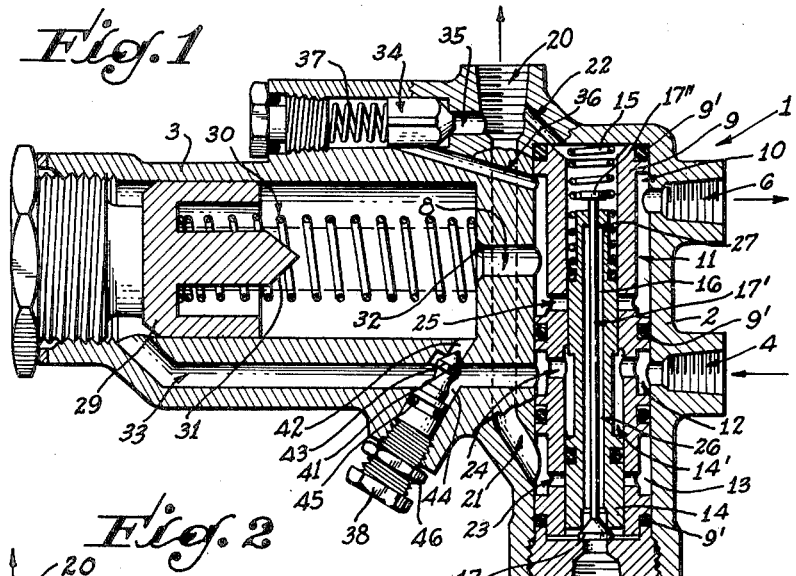
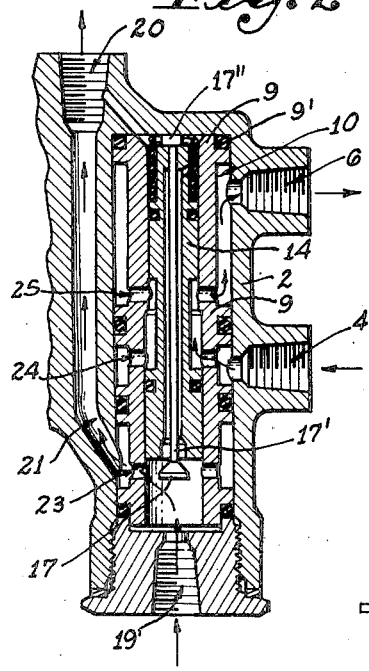
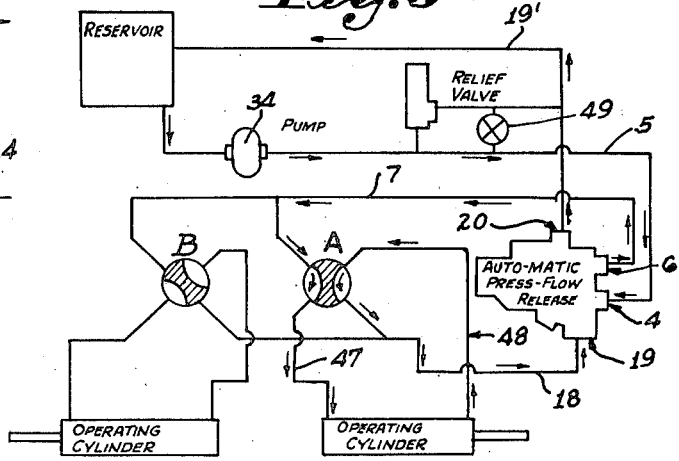
INVENTORS
ROBERT B. SPRAGUE
SEARLE G. NEVIUS
BY HARRIS, KIECH, FOSTER & HARRIS
FOR THE FIRM
ATTORNEYS Aug. 9, 1949.  R. B. SPRAGUE ET AL  2,478,211
HYDRAULIC FUSE VALVE
Filed April 9, 1945  2 Sheets-Sheet 2

INVENTORS
ROBERT B. SPRAGUE
SEARLE G. NEVIUS
BY HARRIS, KIECH, FOSTER & HARRIS
FOR THE FIRM
ATTORNEYS

Patented Aug. 9, 1949

2,478,211

UNITED STATES PATENT OFFICE 2,478,211

HYDRAULIC FUSE VALVE

Robert B. Sprague, Long Beach, and Searle G. Nevius, Santa Monica, Calif., assignors to Howard Field, Los Angeles, Calif.

Application April 9, 1945, Serial No. 587,320
In Canada May 10, 1944

3 Claims. (Cl. 60—52)

This invention relates to an automatic hydraulic pressure flow release valve to be used in hydraulic systems such as on aircraft. Such hydraulic systems usually consist of a reservoir for fluid supply, a power driven pump to supply pressure for moving or operating units desired to be moved to alternate positions, also valves and control means to regulate and control such pressure with piping to interconnect units for routing fluid pressure as desired. Occasionally the pipes in such systems will break from vibration, fatigue, gun fire or other reasons thereby disrupting the system.

Our automatic hydraulic pressure relief valve may be included in such systems so that the pressure supply to the selector four-way valves and return flow from these four-way valves will pass through our valve which will control the fluid in the pipes connected to the four-way valves and the operating cylinder or motor. Our valve will control the fluid flowing to and from such operating cylinder or motor so that if one of the connecting lines should be broken the valve will not open and the pressure supply to the broken line will be blocked off. This blocking off eliminates any excessive loss of fluid so that the remaining fluid in the system may be used to operate another cylinder or motor connected to the same pressure supply source.

This is a continuation-in-part of our copending application Serial No. 478,102, filed March 5, 1943.

It is an object of our invention to provide a novel automatic fluid pressure valve of the character stated which is controlled by the flow of the fluid in the return line, thus, in turn, controlling the pressure supply.

Another object of our invention is to provide an automatic fluid pressure valve in which a displacement unit, such as a cylinder with a piston therein, is held at one end by a spring or equivalent means, which end of the cylinder is connected to the pressure inlet of the control valve, the opposite end being connected to the pressure outlet port and thus providing a means of sending a test sample of fluid through a selected circuit which will move the piston against spring pressure toward the outlet port displacing fluid into the selected circuit and thereby starting the return flow from a cylinder or motor which will in turn open direct pressure supply from the pressure inlet to the pressure outlet port in the automatic valve. When such flow is established the piston will be returned by spring pressure to its original position due to equal fluid pressure on both sides of piston. The outlet end of the cylinder is provided with a seat and the piston is adapted to seat thereon at one end of its stroke in the event the selected circuit pipe is broken, and only the fluid displaced by the piston will flow out the break. In such event there will be no return flow to the valve to open the pressure inlet to the pressure outlet port, and only the amount of fluid displaced by the piston will be lost.

Another object of our invention is to provide a simple and novel means of moving a valve to open a passage from an inlet pressure port to an outlet pressure port by means of a return flow of fluid from the operated circuit.

A feature of our invention is the unbalancing of the controlling valve which is acted upon by return flow so that pressure at the pressure inlet is always tending to close the valve to shut off pressure supply to the circuit should a break occur in a pipe in the operating circuit at a time when flow is actually going through the pipes of the circuit. In this mode of operation, pressure in the return line to open the control valve is less than the pressure supplied at the inlet pressure port tending to keep or return the valve to a closed position.

Another feature of our invention is the provision of a valve which when open will bypass the pressure inlet to the pressure outlet port to facilitate the circulation of fluid during the operation of the system for the purpose of circulating fluid through the system to wash or remove air from the system as the valve will not function in a system when excessive air is trapped in the pipes and cylinders. Such a valve may also be used to reset the displacement piston after the four-way valve has locked fluid from one circuit which has a broken line by putting the four-way valve in neutral position.

Another feature of the invention is to provide such a shut-off valve as is described above in which a small amount of leakage past the piston is permitted until such time as the piston seats on the inner end of the cylinder to shut off further flow of pressure fluid past the piston.

Other objects, advantages and features of the invention will appear from the accompanying drawing, the subjoined detailed description and the appended claims. In the drawing, which is for illustrative purposes only, Fig. 1 is a sectional view of our automatic fluid pressure valve;

Fig. 2 is a sectional view of a portion of the valve shown in Fig. 1, the parts being positioned in open position;

Fig. 3 is a diagrammatic view of a hydraulic system including our valve; and

Figure 4:
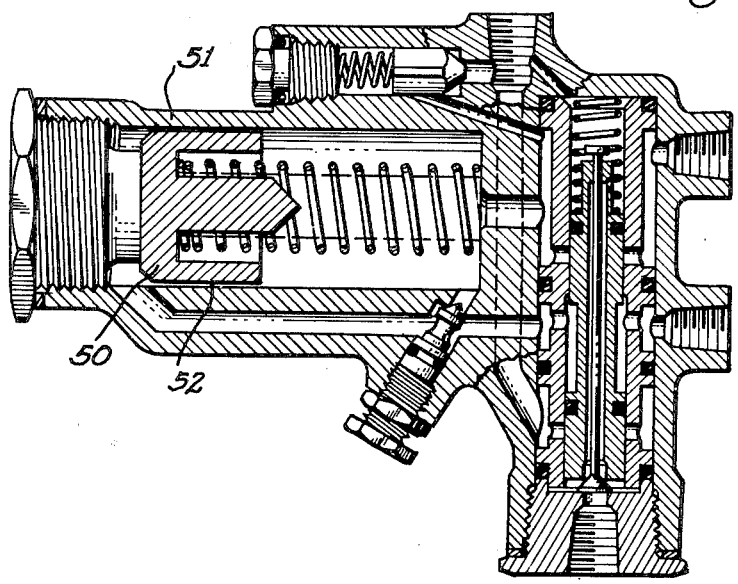
Fig. 4 is a view similar to Fig. 1 of an alternative embodiment of the invention.

Referring more particularly to the drawing, our fluid pressure valve 1 comprises a valve body 2 and a cylinder 3 which may be an integral part of the body 2, may be operatively connected to the body or may be otherwise suitably attached to the body. The valve body 2 includes a fluid pressure inlet port 4 into which the pressure flow line from a pump extends as shown diagrammatically at 5 in Fig. 3. A fluid pressure outlet or exhaust port 6 is also provided in the body 2 to which is connected the primary fluid pressure line to a four-way selector valve "A." This fluid pressure line is shown diagrammatically at 7 in Fig. 3.

A duct or passage 8 extends from the inner end of the cylinder 3 in the valve body 2 in open communication with the port 6 as will be further described. A cylindrical cage or retainer 9 is fixedly mounted in a bore 10 in the valve body 2. This cage is reduced in diameter to provide an annular space or chamber 11 which connects the duct 8 and the port 6 as shown in Fig. 1. The cage 9 is also reduced in diameter at another portion of its length providing a chamber 12 opposite the port 4, and near its lower end the cage 9 is reduced in diameter to provide an annular chamber 13 the purpose of which will be subsequently described. Seals 9' are provided between said chambers to provide pressure seals therebetween.

A control valve 14 is slidably mounted in the cage 9 and is pressed downwardly by a spring 15. The valve 14 is provided with a counterbore 16 and a pilot valve 17 having a stem 17' extends through the counterbore 16 of the valve 14. The stem is provided with a head 17'' on its upper end engageable with the upper end of the valve 14. The valve 17 seats against the lower end of the counterbore 16 thereby sealing the counterbore when the control valve 14 is in its lower position. When the control valve 14 is raised it is forced against the head on the upper end of the valve stem 17' which head engages the upper end of the bore 10. The valve 14 is recessed to form a chamber 14' which is in open communication with ports 24 when the valve is in the position shown in Fig. 1 and in open communcation with ports 24 and 25 when in the position shown in Fig. 2.

A return flow line 18 is connected to a port 19 so that the return flow tends to lift the slide valve 14 until a port 23 is opened allowing flow through port 23 to chamber 13 thence to a passage 21 so long as there is a flow of fluid through the return line 18. A return flow line 19' (see Fig. 3) extends from a port 20 and thence either to a reservoir or to a pressure pump. As thus far described, it is believed to be evident that if any of the lines 7, 18 or any of the other lines connected to the selector valve or the hydraulic operated cylinder should be broken either accidentally or by gun fire, our fluid pressure valve will automatically function to prevent the leakage of fluid through such a broken line.

A duct 22 extends from the return outlet port 20 into the space above the valve 14, thereby permitting fluid to pass out of the space above the slide valve and preventing a fluid lock. The cage 9 is formed with ports 23 which open into the chamber 13 and a second set of ports 24 which open into the chamber 12. The slide valve 14 is reduced in diameter opposite the ports 24 so that the fluid under pressure coming in at the port 4 together with the spring 15 will tend to seat the slide valve as already described.

The stem of the valve 17 extends into a chamber 26 formed as a part of the counterbore 16 of the valve 14 and a restricted port 27 leads from this chamber to the space above the control valve 14 to permit return fluid to pass upwardly and through the duct 22 and into the return flow outlet 20. The valve 17 is held in closed position when the valve 14 is lowered by engaging the inner end of a nut 28 threaded into the bottom of the valve housing 2.

A piston 29 is mounted in the cylinder 3 and is pressed towards the outer end of the cylinder by a coil spring 30. The inner end of the piston 29 is tapered as shown at 31 to form a valve member adapted to engage a seat 32 on the outer end of duct 8 when the piston is pressed inwardly to its fullest extent, and when the piston is so seated no fluid can pass outwardly through the duct 8, annular chamber 11 and thence to the port 6.

A conduit 33 may be an integral part of the cylinder 3 or may be a separate tube if desired. This conduit is open at one end to the primary intake port 4 through the annular chamber 12, and the other end of the conduit extends back of the piston 29, thus, fluid under pressure acts against the outer end of the piston 29 urging the piston inwardly towards its seat 32. A one-way check valve 34 is arranged between the pressure outlet 6 and the fluid return outlet 20 and may be arranged within the body of the cylinder 3, substantially as shown. A duct 35 extends into the fluid return outlet port 20 and the valve 34 seats on the end of this duct normally closing the same. A second duct 36 extends from the chamber 11 and into the bore of the check valve, substantially as shown, so that fluid can flow into the system from the return line 19' and thence into the spring side of piston 29 if pressure on the opposite side of the piston is released. A light spring 37 normally holds the valve 34 in closed position.

Valve body 2 also is provided with a bore for a manually operated valve 38 normally seated on a seat 41 sealing off a passage 42 leading from passage 33 into the inner end of cylinder 3. This valve is provided with sealing means 45, sealing to prevent external leakage of fluid. A check nut 46 is provided to lock valve 38 in place. Valve 38 may be opened to allow fluid from inlet port 4 to flow through the annular chamber 12 to passage 33, past seat 41 into passage 42, to the inner side of piston 29, thence through passage 8 to annular chamber 11 and out port 6 thus by-passing slide valve 14 and piston 29 to provide for circulating fluid in the circuit to remove air from the system. After this is done the valve 43 is seated and locked during normal operations of the valve proper.

Consider the circuit as shown diagrammatically in Fig. 3 as an example. In operation, assume that all the lines are intact and all parts of the system are full of fluid, having previously purged all circuits of the system of all air possible by opening by-pass valve 38 as previously explained. Valve 38 again being seated and locked in place, the pump 34 supplies pressure flow through line 5 into the pressure inlet port 4, thence into recess 12, to and through passage 33 and into the outer end of cylinder 3 thereby acting against piston 29. The piston 29 then moves inwardly urging the fluid in front of the piston through the duct 8, into chamber 11 and out through outlet pressure port 6. The fluid flows into pipe 7, to and through the manually operated four-way selector valve "A" which has already been moved from a neutral position to a position to allow fluid to flow to cylinder 3 causing piston 29 to move thus displacing fluid from the opposite end of the cylinder. The flow from the cylinder is referred to as return flow. The return flow, passing through line 48 and through the four-way valve into line 18 to return inlet port 19 of the automatic fluid pressure valve, forces the slide valve 14 to the position shown in Fig. 2 which simultaneously opens ports 23 and 25. The ports 24 remain open and consequently there is a pressure flow from the port 4 through the ports 24, through annular recess 14' around slide valve 14 to ports 25 and into chamber 11, from which liquid flows out through port 6 to continue pressure supply to the operating cylinder and to cause the return flow to continue, thus holding valve 14 in open position. Pressure flow also enters the inner end of cylinder 3 from recess 11 through passage 8 to balance fluid pressure on both sides of piston 29 thereby allowing spring 30 to return the piston to the outer end of the cylinder as shown in Fig. 1.

As valve 14 is forced to its open position, shown in Fig. 2, by return flow, fluid at the opposite end of valve 14 is displaced through passage 22 into port 20 and subsequently into the return line to the reservoir. The return flow which opens valve 14 passes out through ports 23 into chamber 13, into passage 21 to port 20, thence into the return line to the reservoir to complete the flow cycle. The moving of valve 14 to open position by return flow causes the head on the stem of valve 17 to hit the valve body thereby opening valve 17 as shown in Fig. 2 so that when the operating cylinder has reached the end of its stroke or when the four-way selector valve is moved to a neutral position the return flow is stopped and valve 14 will return to the position shown in Fig. 1. Fluid trapped in the return line as soon as valve 14 passes over ports 23 will flow past valve 17 into chamber 26, out port 27, through passage 22 to return outlet port 20. When valve 14 returns to its lower position it also causes valve 17 to reseat. Thus, the complete valve is reset so that when the system just referred to is again selected to operate the automatic valve will again function to release pressure to operate the cylinder.

In the operation of the valve, should a system with a broken line be selected to be operated, such as a line 47 or 48, the fluid displaced into the system by movement of piston 29 would flow out the broken line, thus no return flow would be available to raise valve 14 to open position and passages connecting pressure ports 4 and 6 would remain closed. Also piston 29 would seat against seat 32 shutting off any more flow from this source so that the fluid lost out of the broken line would be only the amount of fluid displaced by the piston 29 moving inward to seal off port 8.

Should it be desired to operate a second circuit, for instance, such a circuit as that controlled by a second four-way valve "B" (see Fig. 3) the operation would be as follows: After piston 29 has seated, sealing off pressure, the valve 14 remaining in closed position as shown in Fig. 1, the selector valve on the broken system may be returned to neutral thereby shutting off the broken line from the system. By opening a valve 49 the pressure in the supply system will be released and the pressure holding piston 29 against the seat 32 will also be released, spring 30 will force the piston outward, fluid required to fill the cylinder at the inner side of the piston will be sucked from the return line at the return outlet port 20 through passage 35, past valve 34, through passage 36 into chamber 11 and through port 8 into the cylinder, thus resetting piston 3 for another operation of the automatic valve in a system which has no broken lines or units. Valve 49 should then be closed to cause pressure to be built up in the pressure system controlled by four-way valve B. Some hydraulic systems are so arranged that while pressure is not required a valve accomplishing the same purpose as opening valve 49 is provided to allow the pump to circulate fluid at a lower pressure (back pressure due to loss in system only). In such systems the valve would automatically reset itself.

The alternative embodiment shown in Fig. 4 is identical in construction with that shown in Fig. 1, with the exception that it is provided with a piston 50 in a cylinder 51, corresponding generally to the piston 29 and cylinder 3, the piston 50 being of slightly less external diameter than the internal diameter of the cylinder 51 so as to provide a slight clearance 52 therebetween. The purpose of this construction is to prevent fluid pressure from building up on the outer end of piston 50 when the hydraulic system is inoperative, and to provide a by-pass means whereby any excess fluid pressure on the outer end of the piston is relieved through the clearance 52. The clearance 52, of course, is insufficient to prevent piston 50 from moving to the right hand end of its cylinder 51 when a substantial volume of high pressure fluid is admitted to the outer end of the piston to move it to the right, from the position seen in Fig. 4, and as described above in connection with piston 29.

We claim as our invention:

1. In an automatic fluid pressure valve: a valve body having a fluid pressure inlet port, a fluid pressure outlet port, a return inlet port, and a return outlet port; a cylinder communicating at one end with said fluid pressure inlet port and at the other end with said fluid pressure outlet port; a movable piston in said cylinder constructed and arranged so as to permit a small amount of leakage therepast from said one end to said other end of said cylinder whereby a restricted volume of fluid flow into said one end of said cylinder from said fluid pressure inlet port will not produce movement of said piston to said other end of said cylinder, said piston being movable in said cylinder to displace fluid from said other end of said cylinder to said fluid pressure outlet port in response to a volume of fluid flow into said one end of said cylinder greater than said restricted volume of fluid flow; valve means controlling fluid flow between said fluid pressure inlet and fluid pressure outlet ports; and means operable by return fluid through said return inlet port to open said valve means.

2. In an automatic fluid pressure valve, the combination of: valve means having a fluid pressure inlet port, a fluid pressure outlet port, a return inlet port, and a return outlet port; a cylinder communicating at one end with said fluid pressure inlet port and at the other end with said fluid pressure outlet port; a piston in said cylinder movable from said one end of said cylinder to the other end thereof in response to a substantial volume of flow of fluid into said one end thereof to displace fluid from said other end of said cylinder to said fluid pressure outlet port; restricted by-pass means for permitting a restricted volume of fluid flow between said pressure inlet port and said pressure outlet port so as to prevent movement of said piston in the event of such a restricted volume of fluid flow; valve means controlling fluid flow between said pressure inlet and pressure outlet ports; and means operable by return fluid through said return inlet port to open said valve means.

3. In an automatic fluid pressure valve, the combination of: valve means having a first port, a second port, a third port, and a fourth port; a cylinder communicating at one end with said first port and at the other end with said second port; a piston in said cylinder movable from said one end of said cylinder to the other end thereof in response to a substantial volume of flow of fluid into said one end thereof to displace fluid from said other end of said cylinder to said second port; restricted by-pass means for permitting a restricted volume of fluid flow between said first port and said second port so that such a restricted volume of fluid flow will not move said piston in said cylinder; valve means controlling fluid flow between said first and second ports; and means operable by fluid through said third port to open said valve means.

ROBERT B. SPRAGUE.
SEARLE G. NEVIUS.

REFERENCES CITED

The following references are of record in the file of this patent:

UNITED STATES PATENTS

| Number | Name | Date |
|---|---|---|
| 1,250,388 | Titus | Dec. 18, 1917 |
| 1,855,433 | Vickers | Apr. 26, 1932 |
| 2,093,015 | Madden | Sept. 14, 1937 |
| 2,238,124 | Mathieson | Apr. 15, 1941 |
| 2,245,271 | Guill | June 10, 1941 |
| 2,351,035 | Grant | June 13, 1944 |
| 2,377,278 | Stephens | May 29, 1945 |
| 2,428,150 | Field | Sept. 30, 1947 |